(12) United States Patent
San Miguel

(10) Patent No.: US 6,732,827 B2
(45) Date of Patent: May 11, 2004

(54) INDEPENDENTLY POWERED COMPUTER CONTROLLED VEHICLE WHEELS

(76) Inventor: Alfonso Jose San Miguel, 1 Gillman St., Irvine, CA (US) 92612-2705

( * ) Notice: Subject to any disclaimer, the term of this patent is extended or adjusted under 35 U.S.C. 154(b) by 110 days.

(21) Appl. No.: 10/057,092

(22) Filed: Jan. 28, 2002

(65) Prior Publication Data

US 2003/0141129 A1 Jul. 31, 2003

(51) Int. Cl.$^7$ ........................ B60K 17/356; B60K 7/00; B60K 6/00
(52) U.S. Cl. .................... 180/242; 180/65.4; 180/65.5; 180/65.8; 180/308; 62/239; 165/43
(58) Field of Search ..................... 180/242, 65.1–65.5, 180/65.8, 301, 308; 165/42, 43, 51, 52, 202; 62/239, 259.2

(56) References Cited

U.S. PATENT DOCUMENTS 3,670,808 A * 6/1972 Wait ............................ 165/42
4,089,384 A * 5/1978 Ehrenberg ................... 180/242
4,098,093 A * 7/1978 Czyl ............................ 62/243
4,913,258 A * 4/1990 Sakurai et al. .............. 180/242
5,942,017 A * 8/1999 Van Winkle, Sr. .......... 55/385.1

* cited by examiner

Primary Examiner—Lesley D. Morris
Assistant Examiner—Matthew Luby
(74) Attorney, Agent, or Firm—Mathews, Collins, Shepherd & McKay, P.A.

(57) ABSTRACT

A propulsion system for a four-wheel-drive vehicle, including four independently powered, computer controlled wheel assemblies (24). A turbogenerator (10) for charging a storage battery (12). A power distribution unit with a central processing unit (18). A power-sensor harness (26). A separate air-conditioner (16) for providing cold, filtered, dehumidified-air for cooling the motor-generators (40). Floor mounted accelerator and brake pedals (82)(84) coupled with electronic means (86) for accelerating, decelerating and braking the vehicle. A fuel tank (20) for running the turbogenerator (10). A comprehensive, state of the art instrument panel with electronic and audio instrumentation covering every vital function of the propulsion system. The instrument panel is not illustrated.

6 Claims, 3 Drawing Sheets

# INDEPENDENTLY POWERED COMPUTER CONTROLLED VEHICLE WHEELS

CROSS-REFERENCE TO RELATED APPLICATION

Not applicable

BACKGROUND—FIELD OF INVENTION

This invention relates to electric vehicles

BACKGROUND—DISCUSSION OF PRIOR ART

Over one hundred years ago, in a small town near Cologne, Germany, Dr. Nicholas Otto and Gottlieb Daimler built the first successful internal combustion engine. It had one cylinder, and was attached to a bicycle.

Thereafter, many inventors began experimenting with larger engines attached to horse buggies.

In the United States, Henry Ford, Alex Winton, Frank Duryea, Elwood Haynes and others got busy.

By 1910 more vehicles were powered with internal combustion engines than pulled with horses. Henry Ford had much to do with the development of the assembly-line system, that made it possible to produce and sell a motorcar within the means of most American families. Although one had to crank the engine to get it started.

By the early twenties ladies began driving cars. Producers of the more stylish and expensive cars added an electric starter.

Some engines were started with compound-motor-generators. The battery was automatically charged with the same unit.

The same era witnessed the tremendous expansion of the automobile industry. New engines were designed, built and tested. The first electric motorcars and trucks were made. A steam engine powered car was built and made a brief showing. The prime complaint was that it took too long to build-up a head of steam before it could be driven.

In the mid-fifties the Chrysler Corporation built a passenger car with a regenerative, free-turbine engine. This engine could run with a variety of fuels including gasoline, diesel fuel, alcohols, jet fuels and blends.

Regenerative type turbine engines, reduce fuel consumption, exhaust temperature, vibration, noise, toxic emissions and start easily.

However, turbines have one inherent drawback, they perform very efficiently at one rotation speed. At part load or idle condition, the efficiency drops off significantly, below that of internal-combustion engines with their Carnot cycle efficiency limit. About 35%. Acceleration from stop or slow speeds is poor.

The turbine-powered car could not compete with the passenger car built with an internal combustion engine.

Leading automobile companies continue to experiment and build larger versions of the automobile gas turbine for busses, trucks and other heavy duty ground applications in the range of 300 to 600 horsepower. A power transfer system similar to an automatic transmission without torque converter has been developed and used successfully.

In 1997 Toyota, in Japan, introduced a hybrid car powered with an electric motor, gasoline engine system. It operates as an electric car at slow speeds, when air pollution is at the maximum point for gasoline engines. The gasoline engine cuts in when the car accelerates and attains cruising speed. The batteries are recharged while the gasoline engine drives the car.

Chrysler, General Motors and Ford in the USA, Honda and Nissan Motor Co. in Japan and the Audi Division of Volkswagen are also working on hybrid cars. R&D projects planned to improve the internal-combustion-engine continue. It is time to replace the marvel that changed the world over one hundred years ago with a more efficient, non-polluting propulsion system.

Dr. Nicholas Otto and his friend, Gottlieb Daimler will not be forgotten.

SUMMARY OF THE INVENTION

The independently powered computer controlled vehicle wheels according to the invention include a turbogenerator, storage battery, a power distribution unit with CPU systems control unit, a power-sensor harness, a separate air conditioner for providing cold, filtered, dehumidified-air for cooling the motor-generators. Floor mounted accelerator and brake pedals and an optional comprehensive instrument panel.

Other features of the invention will become apparent as the description proceeds especially when viewed with the accompanying drawings illustrating the invention.

IN THE DRAWINGS

Figures 1, 2:
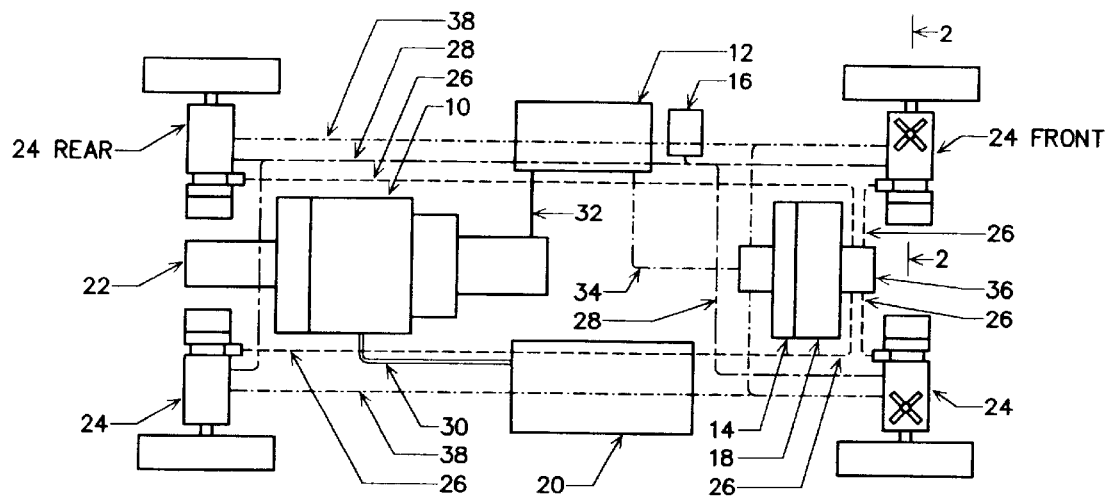
FIG. 1 is a schematic diagram, top view, showing the relative position of the invention components at the chassis level of the vehicle.
FIG. 2 is a sectional view taken through the wheel assembly of FIG. 1 at line 2—2.
Figure 5A:
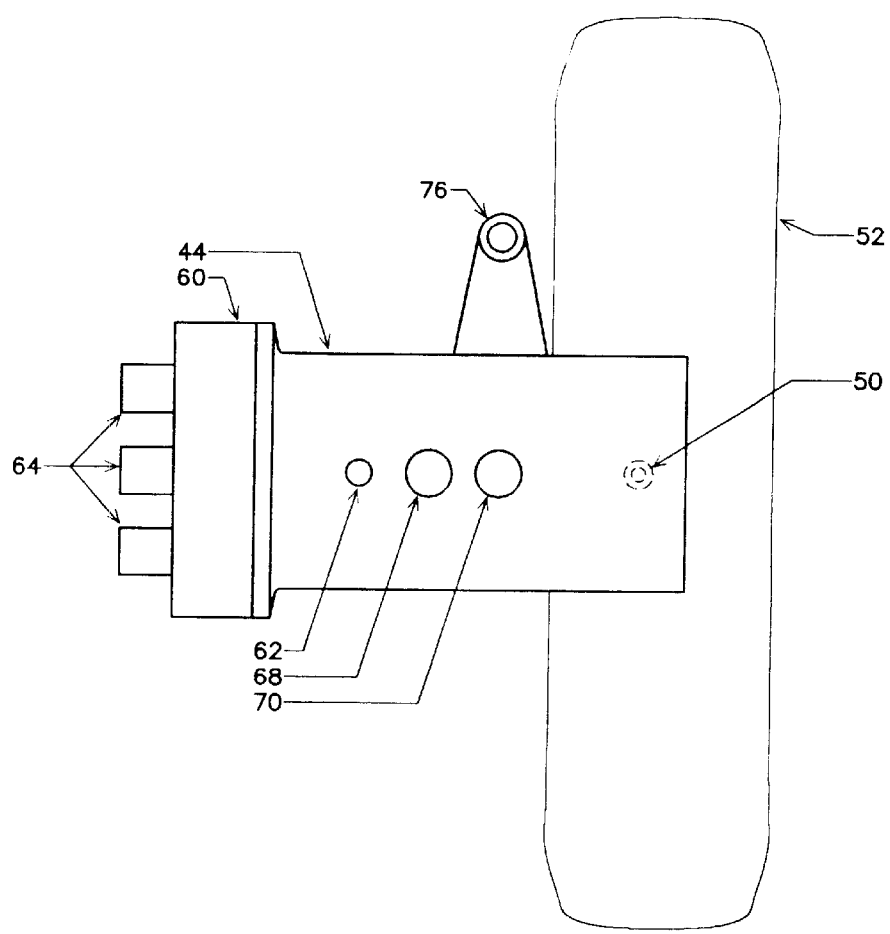

FIG. 5A is a top view of the right front wheel taken along line 5—5 of FIG. 2. Also shown is the approximate location of the steering knuckle 76. The left front wheel is a mirror image of the right front wheel.

Figure 5B:
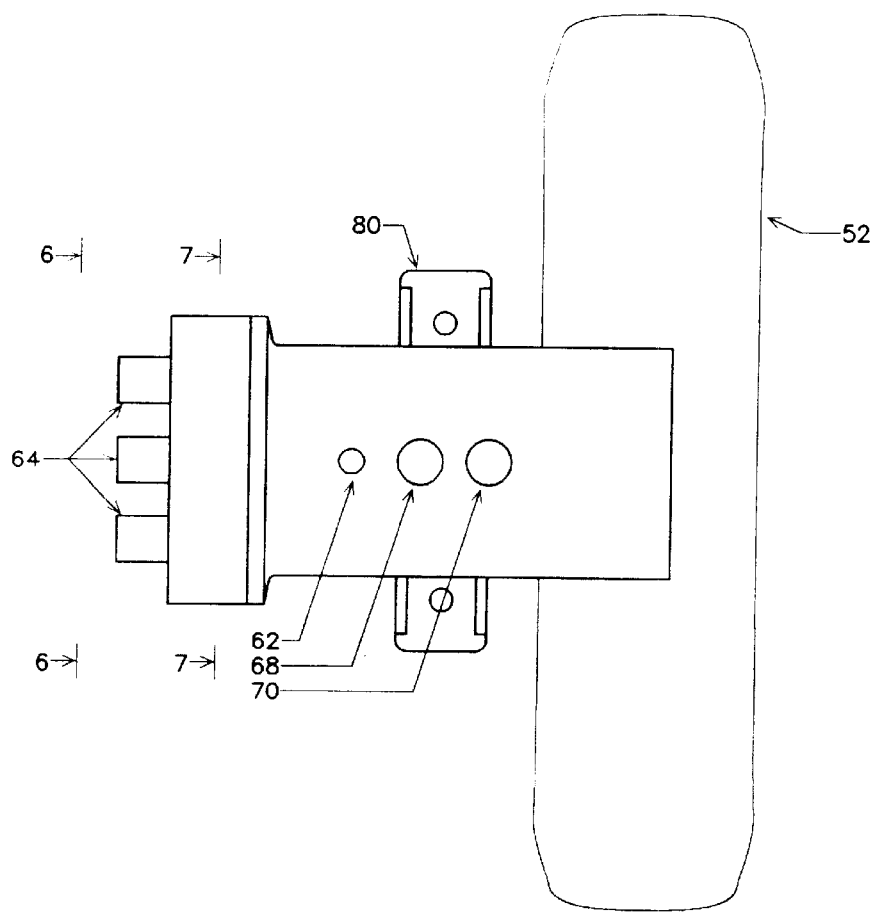

FIG. 5B is a top view of the right rear wheel taken along line 5—5 of FIG. 2. Also shown is the spring seat 80. The left rear wheel is a mirror image of the right top view.

Figure 6:
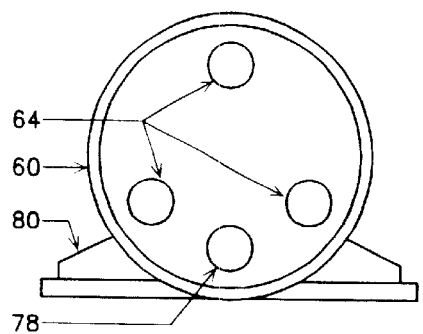

FIG. 6 is a view taken at line 6—6 of FIG. 5B. Shown are three equally spaced hydraulic brake actuators 64. Also shown is the parking brake component 78 a mechanical device which is actuated with a pull-knob and sheathed cable mounted on the dashboard within reach of the driver. The pull-knob and sheathed cable with connector fittings are not shown.

Figure 4:
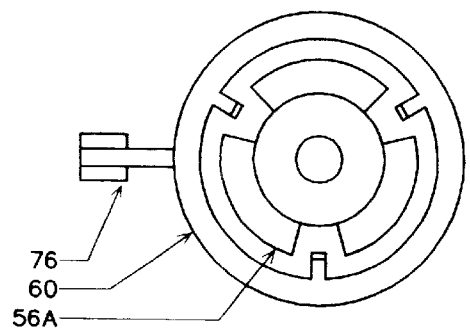
FIG. 4 is a sectional view taken along line 4—4 of FIG. 2.
Figure 7:
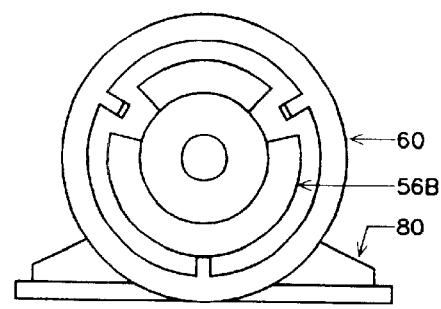

FIG. 7 is a sectional view taken along line 7—7 of FIG. 5B. Shown is the elongated brake pad 56B to complement the parking brake component 78 FIG. 6. Also shown is brake pad 56A of FIG. 4. Parking brakes are installed on rear wheels only.

Figure 8:
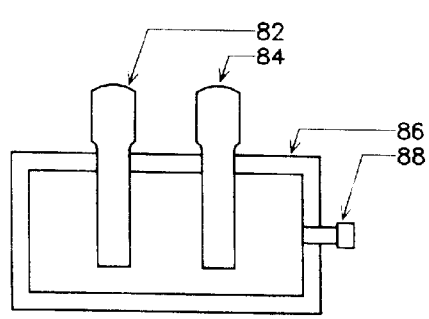

FIG. 8 is a schematic diagram, top view, showing the relative position of the brake and accelerator pedals 82, 84 and electronic control box 86 containing electronic elements and sensor cable terminal 88.

DESCRIPTION OF THE INVENTION

Turbogenerator 10 as illustrated in FIG. 1 couples a compound-wound direct current-generator with a regenerative turbine engine. The turbine exhaust duct 22 is secured to the turbogenerator with means for facile replacement.

Fuel tank 20 is mounted with suitable means to the chassis 38. Fuel line 30 is connected between the fuel tank 20 and the turbine fuel inlet. The fittings are not shown. Armored generator cable 32 connects the generator power outlet to the battery 12, power inlet. See FIG. 1. Battery cable 34 connects battery 12 to power distribution unit 14.

Figure 3:
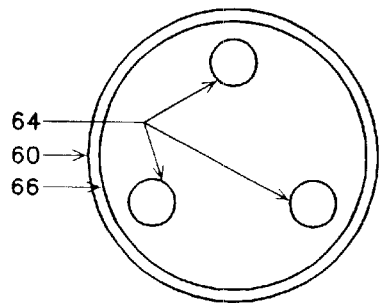
FIG. 3 is a view taken along line 3—3 of FIG. 2.

Wheel assembly FIG. 2 is a cylindrical metal housing flanged at one end 44. The flanged end provides an interface for mounting the brake housing 60 and brake components, brake pad assembly 56A, brake disc 58, brake cover 66 with hydraulic brake actuators 64. See FIGS. 3 and 4. Three equally spaced key and keyway slots are provided for facile servicing or replacement of the brake pad assemblies. The keys are integral within the brake housing. The connection between the brake disc 58 and the extended shaft of the compound motor-generator 42 is done per specification, Involute Spline ANSI B92.1-1970. The compound motor-generator 40 with extended shaft 42 and bearings 46 are slip-fitted into the housing bore and secured with retaining rings or similar devices. The wheel 48 and tire 52 are mounted as shown in FIG. 2 by conventional means to the shaft end 42 with a wheel mounting plate 54 and standard studs nuts and bolts.

The four wheel assemblies FIG. 2 are identical except for the means used to connect the front pair to a modified upper and lower wishbone type suspension. The shock absorbers are installed in the conventional manner. The configuration of the kingbolt 50 may be modified to satisfy the manufacturer. This does not alter the intent or purposes of the invention. The rear pair is easily mounted by attaching a spring seat or suitable mounting plate to the housing 44 with appropriate boltholes for attaching a spring seat to a conventional laminated leaf spring suspension.

The power and sensor harness 26 FIG. 1 connects the power and sensor terminal box 36 FIG. 1 to power cable terminal 62 FIG. 2 mounted on housing 44 FIG. 2, also connected from the same harness is the sensor connection between the power and sensor terminal box 36 FIG. 1. CPU systems control unit 18 FIG. 1 is a computer designed and programmed to integrate the dynamic signals of the four wheel assemblies. Wheel assembly FIG. 2 is provided with a dynamic multi-axis load cell 68 mounted on the housing 44 FIG. 2 which transmits vertical load vector, torque signals and angular velocity of the compound motor-generators to systems control unit 18.

The annular space formed on the inside surface of the housing 44 FIG. 2 provides a cold air passage 72 FIG. 2 for circulating thermostatically controlled cooling air to dispel heat generated by the compound motor-generators. The air conditioner 16 FIG. 1 delivers filtered, dehumidified cold air thru a circulating closed system of thermally coated cold air lines 28 FIG. 1 to the four independently powered computer controlled wheels 24 FIG. 1. The power and temperature settings are also controlled from the CPU systems control unit 18 FIG. 1 thru the power and sensor harness 26 FIG. 1.

The conditioned air enters the cold air passage 72 FIG. 2 surrounding the compound motor-generator 40 FIG. 2 thru thermostatic cold air valve 70 FIG. 2 at low positive pressure. The condensate drain pressure relief valve 74 FIG. 2 has two outlet ports, one port is connected to the return side of the cold air line 28 FIG. 1, the other port exhausts condensate and low pressure air to ambient air to maintain a predetermined positive pressure in the cold air passage of the compound motor-generators.

The turbogenerator 10 FIG. 1 is the main source of electric power for charging the battery 12 FIG. 1. Auxiliary electric power is generated by the motor-generators when used as generators for dynamic braking. The operating voltage range is computer controlled to select the turbogenerator power source or the auxiliary power of the motor-generators or both. The turbogenerator is designed to work at the most efficient rotation velocity. It does not "idle". It is either "on" or "of". Excess power generated by dynamic braking on long downhill grades is dissipated with resistance grids connected to the power and sensor harness 26 FIG. 1 located inside of the venturi type turbine exhaust duct 22 FIG. 1.

Acceleration, deceleration and braking is controlled by electronic means located in the floor mounted accelerator and brake pedal assembly FIG. 8. The dynamic signals of the multi-axis load cell 68 FIG. 2, vertical load vector, torque and angular velocity of the four wheels is transmitted from the CPU systems control unit 18 FIG. 1, to the brake and accelerator pedals, floor mounted assembly FIG. 8 that includes means for modulating the signals and returning the control information to the CPU systems control unit for managing the power distribution unit 14 FIG. 1 to the four independently powered and independently controlled wheels.

Hydraulic friction disc-brakes are used to supplement and/or blend with the dynamic brake system. Also used exclusively in the stopping mode when the velocity is approximately 10 mph or less before coming to a smooth, complete stop.

The parking brakes, rear wheels only, are manually applied with a pull-knob located on the dashboard.

Automatic cruise control is managed with push buttons located on the dashboard.

ADVANTAGES OF THE INVENTION

This propulsion system is simple, efficient, reliable and non-polluting. It will more than double the miles per gallon and cost less than half the amount to produce when compared with any vehicle of the same size and weight with an internal combustion engine. It will accomplish this without using gears.

The following mechanical items will not be used in the propulsion system: gears, camshafts, tappets and hydraulic valve lifters, push rods, valves and springs, crankshaft, pistons, wrist pins, timing chain drives and radiator, fans, v-belts and other rotary and reciprocating elements, sparkplugs, distributors and spark coils. Also not used in this power train; drive shaft, differential, axles, universal-joints, transaxles and final drive components and automatic transmissions are too intricate. The so called "advanced technology", for four wheel drive systems with "intelligence" will never come close to the efficient simplicity of the propulsion system advocated by this invention.

The dynamic multi-axis load cells including the vertical load vector, the torque and angular velocity signals of the four wheels are monitored with a high degree of accuracy and routed thru the central processing unit for controlling the wheels and displaying the system conditions at the comprehensive instrument panel to keep the driver informed. It's important. It adds to the safety of the driver and passengers, especially when the roads are wet and icy during the stormy months. The torque is instantly, constantly adjusted to make it even for the four wheels while maintaining a safe speed.

The comprehensive instrument panel includes state of the art means for displaying and including audio means for keeping the driver informed. Of particular interest is the turbogenerator speed, "in" and "out" air-as temperature of the turbine engine, the generator output, measured volt-amp charging rate and the battery charge level. A bar-graph readout cluster for each of the four wheel assemblies indicating position, load vector, torque and rotation velocity is included. Also included is the temperature of the cooling air for the motor-generators taken at the cold air valve "in" and the pressure relief valve "out". Also included is an inclinometer for the off-the-road sportsman indicating safe and rollover angles of risky mountain slopes.

While I have illustrated and described a preferred embodiment of my invention, it is understood that this is capable of modification, and I therefore do not wish to be limited to the precise details set forth, but desire to avail myself of such changes and alterations as fall within the purview of the following claims.

What I claim my invention is:

1. A propulsion system for a four wheel drive vehicle comprising:

four independently powered computer controlled wheel assemblies;

a plurality of compound motor generators each having an extended shaft, said extended shaft having a first end mounted to one of said wheel assemblies and having a second end connected to a brake assembly associated to one of said wheel assemblies;

a main power source providing power to said compound motor generators, said main power source comprising a turbogenerator coupled to a battery, and air conditioning means providing cooling air to each of said compound motor generators to dispel heat generated by said compound motor generators.

2. The propulsion system of claim 1 wherein said air conditioning means comprises a cold air passage surrounding each of said compound motor generators and a thermostatic cold air valve for providing said cool air at low positive pressure.

3. The propulsion system of claim 1 wherein said air conditioning means is a closed system comprising a plurality of cold air lines for circulating said cooling air to said four wheel assemblies.

4. The propulsion system of claim 1 wherein said wheel assembly includes a dynamic multi-axis load cell for transmitting vertical load vector, torque signals and angular velocity of said compound motor generator to a control unit.

5. The propulsion system of claim 4 further comprising an instrument panel coupled to said control unit, said instrument panel displaying conditions of said propulsion system.

6. The propulsion system of claim 4 further comprising a brake pedal and an accelerator pedal and electronic means located in said brake pedal and said accelerator pedal, said electronic means receiving signals from said control unit for controlling acceleration, deceleration and braking of said propulsion system.

* * * * *